UNITED STATES PATENT OFFICE.

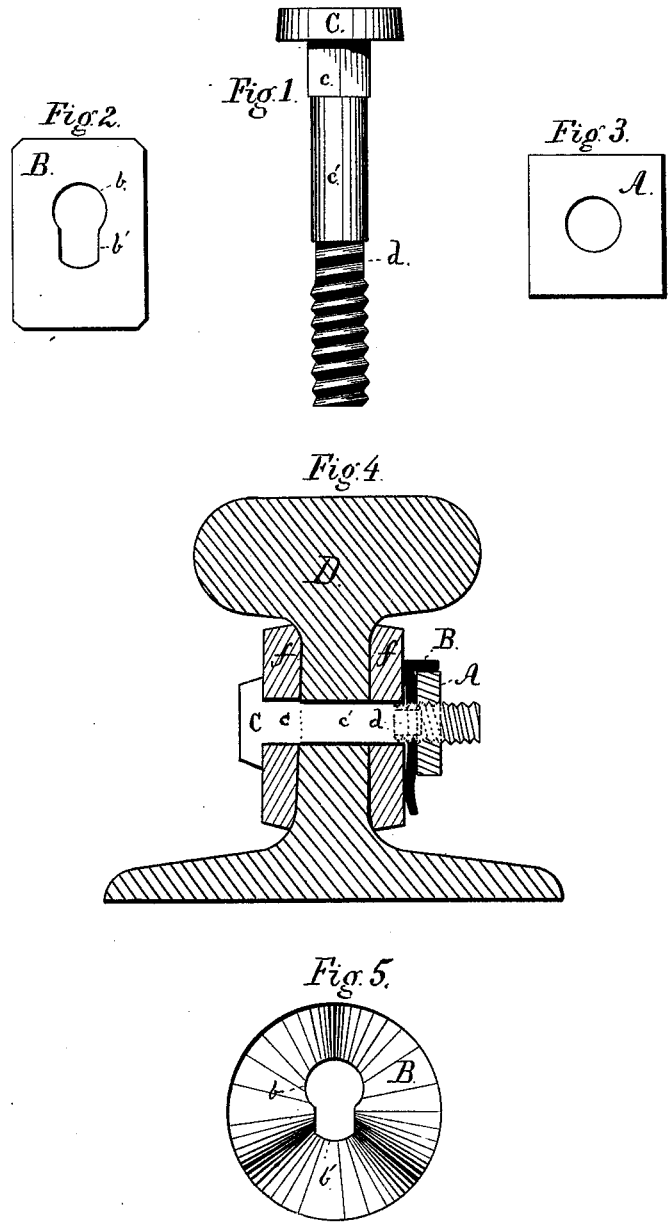

EDWIN REESE, OF BALTIMORE, MARYLAND.

IMPROVEMENT IN NUT-LOCKS.

Specification forming part of Letters Patent No. 198,521, dated December 25, 1877; application filed December 7, 1877.

*To all whom it may concern:*

Be it known that I, EDWIN REESE, of the city of Baltimore, State of Maryland, have invented certain new and useful Improvements in Nut-Locks; and I do hereby declare the same to be fully, clearly, and exactly described as follows, reference being had to the accompanying drawings, in which—

Figure 1 represents a side elevation of the bolt; Fig. 2, a plan view of the washer; Fig. 3, a similar view of the nut; Fig. 4, a sectional view of the device as a whole, applied to the fish-plates of an ordinary T railroad-rail; and Fig. 5, a plan view of a modified form of washer.

The principal requisites in a device of this class are, that it shall afford perfect security against the accidental loosening or unscrewing of the nut, and that it shall be readily removable when required.

Various forms of nut-lock have been devised, but are objectionable, almost without exception, on account of their failure to fill the bill in the above-named respects, being, as a rule, liable to work loose, or so difficult of removal as to be practically rivets.

My nut-lock is open to neither of these objections. It affords absolute security against the unscrewing of the nut, and a single tap of a hammer will enable it to be loosened when desired.

The bolt represented in Fig. 1 has the ordinary square or polygonal shoulder near the head, the cylindrical and the threaded portion usually seen, and differs from an ordinary bolt only in being compressed slightly on opposite sides, as shown at $d$.

The nut A is of the ordinary construction. A washer, B, is stamped out of malleable sheet metal, and is perforated, as shown. The circular aperture $b$ is large enough to admit of the washer being slipped over the threaded portion of the bolt, while the communicating slot $b'$ is adapted to fit the compressed portion of the same. This compressed portion should be but slightly wider than the thickness of the washer, and at a distance from the head of the bolt about equal to the thickness of the article through which the bolt is intended to pass.

In applying the device the bolt is inserted, the washer slipped over the threaded end of the bolt, and moved laterally until the compressed portion of the bolt is within the slot $b'$. The nut is then screwed home, and the projecting side of the washer is finally bent up against the side of the nut.

It is obvious that the washer cannot turn upon the bolt, and the bent end of the washer effectually prevents the turning of the nut.

In order to remove the nut it is only necessary to flatten the washer, when the nut may be readily unscrewed.

In applying my invention to the fish-plates of railroad-rails, I make use of a modified form of washer, as shown in Fig. 5. Were it possible to maintain friction between the nut and fish-plate, the danger of the unscrewing of the nut would be materially lessened, but not obviated.

The jolting of the train in passing over the rail-joints soon batters the thread upon the bolt to a slight degree, leaving the nut out of contact with the fish-plate and free to unscrew with every succeeding shock or jolt.

The washer shown in Fig. 5 is corrugated radially, and perforated in a manner similar to that hereinbefore described.

The nut is screwed home upon the washer, which acts as a sort of spring, its projecting edge being finally bent up against the nut, as shown. The fish-plates are thus held with a somewhat yielding pressure against the rail, and the battering of the thread obviated, while securing immunity against the accidental unscrewing of the nut.

It will be observed that by compressing the bolt for but a short distance, as shown, its strength is impaired to but a very slight degree, while the normal amount of bearing-surface of thread within the nut is maintained.

Having thus described my invention, what I claim as new, and desire to secure by Letters Patent, is—

The combination, in a nut-lock, of an ordinary nut, a bolt compressed laterally, and a flexible washer, radially corrugated and perforated and slotted, as shown, and for the purpose described.

EDWIN REESE.

Witnesses:
T. D. WILLIAMS,
PHILIP R. REESE.